United States Patent Office 2,720,463
Patented Oct. 11, 1955

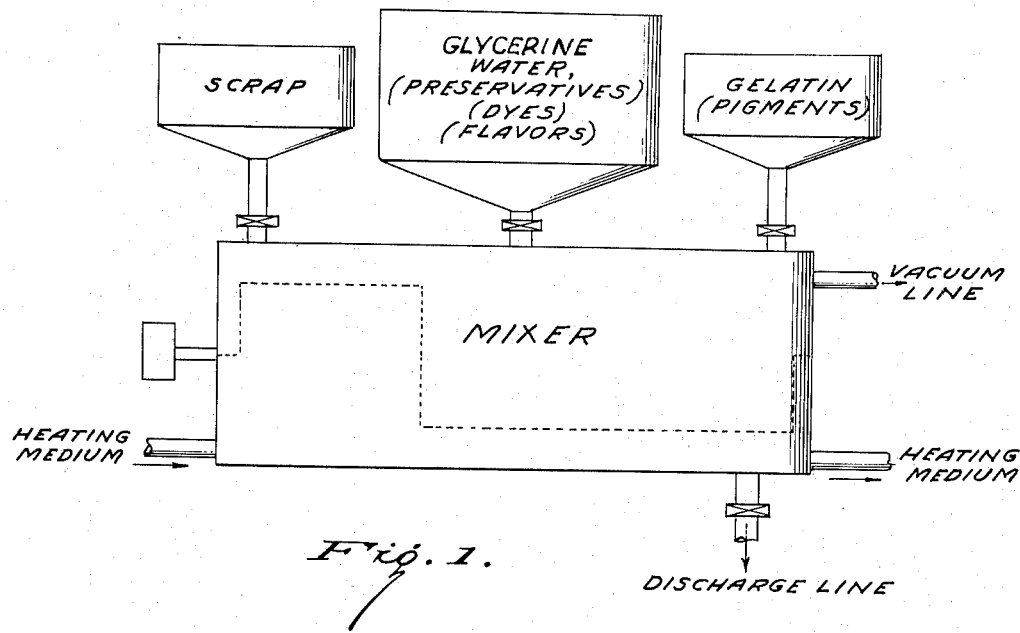
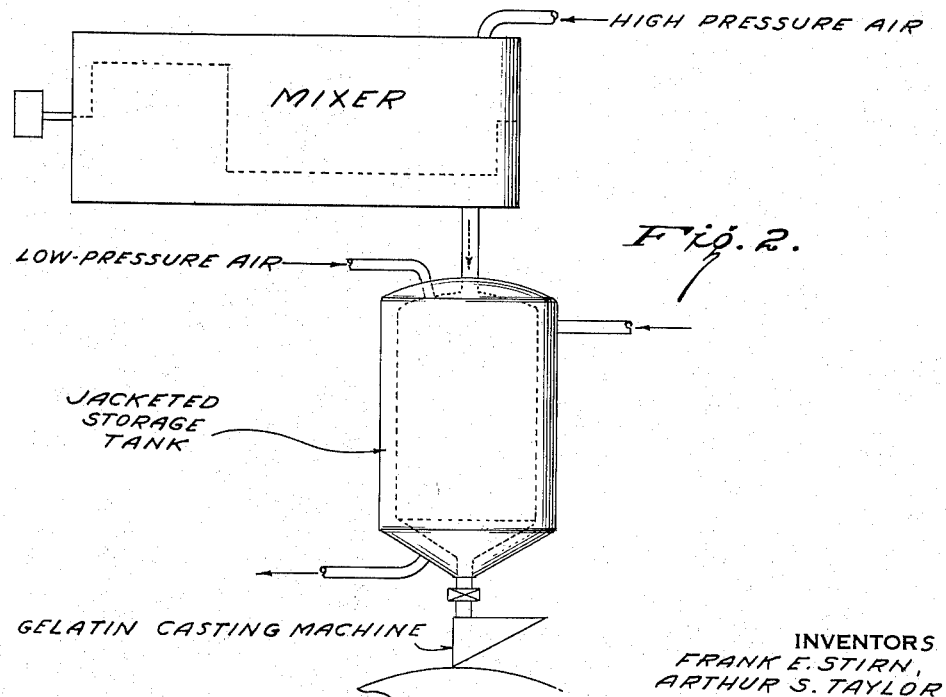

2,720,463

GELATIN CAPSULE CASTING COMPOSITION PREPARATION

Frank Edwin Stirn, Pearl River, and Arthur Sinclair Taylor, Spring Valley, N. Y., assignors to American Cyanamid Company, New York, N. Y., a corporation of Maine Application November 17, 1950, Serial No. 196,116

9 Claims. (Cl. 106—135)

This invention relates to improvements in a method and apparatus for preparing a gelatin composition to be cast in a strip to be used in manufacturing soft gelatin capsules.

It is an object of this invention to provide a method and an apparatus for the practice of the method whereby a gelatin capsule casting composition may be easily and expeditiously prepared, and provide for the incorporation of residual net and gelatin film scrap in the composition, provide for the incorporation of flavors, pigments, dyes, perfumes, preservatives and other desired materials in the composition; and to permit the incorporation of a pork skin gelatin, which is cheaper than the normally used bone gelatin, in the composition, and to permit the incorporation of a plasticizer with the gelatin at the time of manufacture.

It is also an object of this invention to provide a means whereby it is possible to use a mixing machine continuously without the necessity for cleaning the machine before each batch.

It is also an object of this invention to provide a system whereby the gelatin mixture is provided continuously for a capsuling machine, so that the casting machine may be operated continuously, while the gelatin mixture is prepared in batches.

In the past, it has been the custom to start with a clean mixer and load in the clean mixer the desired quantity of bone gelatin, and to the bone gelatin, while cold, add the desired quantity of water and then the desired quantity of glycerin, and mix this material while still cold until all of the liquids had been absorbed by the gelatin and there was formed a soft, gummy sponge. This sponge could be kept for a short period in a cold room. For use, it was transferred to a melting tank where it rested on heating coils, and as the material melted, it flowed through the coils and down into a holding tank, where it was stored for a period of approximately three days to permit air bubbles to escape and the material to become homogeneous, at which time it was ready for use. This is a particularly inconvenient procedure, because it is an extremely slow procedure, requires the materials to be made up a long time in advance, and the long storage time permits the gelatin to degrade to an undesirable extent.

Attempts of the prior art to get away from this type of preparation are exemplified, for example, in the patent to Erickson 1,857,630 in which the dry gelatin is passed through a spray of water, each particle being wetted by the water as they fall into a common container. This type of preparation is not satisfactory for our particular compositions, because the proportion of water available is too small.

We find that by using a power mixer as for example, a Sigma-Arm mixer or Ribbon mixer, both of which are standard in the chemical process industry, and which mixer is jacketed for heating and which is vacuum tight, it is possible to start with a mixer, either clean or in the condition in which it is left at the end of a batch. There is fed to the mixer the desired quantity of water, the desired quantity of glycerin, and any water-dispersible materials, such as flavors, perfumes, dyes and preservatives, which may be desired, and which materials may be dissolved in alcohol rather than water and added to the composition, and the whole mixture stirred by the mixer until the residual contents of the tank are thoroughly and intimately mixed with the liquid in the tank. This is desirably accomplished at a temperature not appreciably above normal room temperature or about 25 to 33° C. To the liquid is then added rapidly the solid gelatin, which may have incorporated therewith any pigments or solids to be incorporated into the mixture. The solids may be added through a vacuum tight trap, or they may be added at atmospheric pressure. The mixture should be thoroughly and rapidly agitated to insure prompt mixing of the gelatin and the liquids, although a slight delay is permissible if all of the components are cold. The mixing must be complete before the gelatin is appreciably hydrated to obtain uniform hydration.

As soon as the solids are added, the mixer may be closed and the vacuum applied thereto, or the mix may be stirred for a while first. The vacuum is applied before air is entrained in the mix, and may be applied at any time before there is appreciable melting of the mix, or before an appreciable quantity of air can be dispersed in the composition. We prefer to pull down to nearly the vapor pressure of the liquids in the mixer and continuously agitate the solids and liquids while holding this vacuum. It is possible to remove practically all of the air from the system before there is any tendency for the materials to foam or fluff or boil. If the mixer is air-tight, the vacuum connection can be closed off; otherwise, the vacuum pump may be left attached. No appreciable portion of the liquids present should be distilled off.

While the material is being agitated in the jacketed mixer, heat is applied. A hot water jacket may be used, or steam, or other form of heat. We find that steam, at approximately 100° C., is a very rapid and effective form of supplying the heat. The heat may be supplied by opening a steam valve to a jacket while the mixer is continuously operated, so that there will be no local overheating. With agitation during the heating, it is possible to use comparatively high rates of heat transfer and the mixture may be completely liquefied within a comparatively short time, depending upon the size of mixer being used. From 10 minutes to an hour usually suffices. The heat input must be carefully controlled. It is desirable to bring the composition up to a temperature of approximately 56° C. If the temperature is brought much above 60° C., the material tends to hydrolyze so rapidly that within a short time it loses its resilience and strength.

The gelatin formulation begins to melt at about 40° C., and can be stored molten near this temperature. For long storage, the lower temperatures are desired. Because the composition at low temperatures is so viscous, it is more desirable to operate above about 46° C., and more convenient above about 54° C. The temperature can be raised in the transfer to the casting machine, so that the composition may be stored below the casting temperature. The composition has the peculiar property of not attaining its new viscosity immediately, almost as if it "remembered" its recent temperature.

Because of the extreme viscosity of the solution, it takes a long time to warm or cool the solution unless continuous agitation is used. Therefore, for our purposes, we desire to bring the composition to approximately 46° C. to 60° C., which is a desirable casting temperature range, in the original mixer and maintain it at this temperature without change until it is processed into capsules. We prefer about 56° C.

To avoid overrunning the temperature, we prefer to reduce the rate of application of heat as this temperature is approached, and then permit the mixture to be stirred for several minutes, until the entire mixer assembly reaches heating equilibrium to be sure that no portions will be overheated while other portions are left cool, and to be sure that the temperature is as desired. It is normally found that as soon as the temperature has been reached, the mixture will have been stirred sufficiently to be completely homogeneous, for all of the gelatin to be hydrated; and the mixture as thus formed is then ready to be cast into a gelatin film for the preparation of capsules with no additional holding or heating or treatment.

At this point, the mixture may be transferred to the gelatin casting equipment.

A bottom connection on the mixer may serve as a discharge line. Gas pressure may be applied under sufficient pressure to force the gelatin from the mixer through the discharge line into a storage tank. Compressed air is an economical gas; inert gases are not needed. We prefer a jacketed storage tank to keep the mixture warm.

The storage tank may feed by gravity into a casting machine. We find it more convenient to have all of the equipment on one level and in a single room, and to use a closed holding tank which is under a low air pressure, for example 10 pounds per square inch, which will force the gelatin from the bottom of the holding tank through a heated line, into the hopper of the gelatin casting machine. By using higher pressure air for transfer from the mixer to this low pressure holding tank, it is possible to fill the holding tank while it is under operating pressure. Because of the homogeneity of the mixture and because the material is stable in the holding tank for periods of several days at 56° C., we find it most convenient to use the holding tank for continuous operation or as required, and replenish the holding tank with batches from the mixer. By using water-jacketed lines and maintaining the gelatin at 56° C. or thereabouts, at all times, it is possible to avoid having to heat or cool it.

We find it desirable to use a flexible rubber tubing with clamps as a pinch-valve for the control of the flow. As soon as the gelatin mixture has been transferred from the mixer, the discharge valve is closed and, without further treatment the mixer is ready for processing a second batch.

The advantages of being able to use the mixer and all of its associated equipment without having to clean the last batch of gelatin from it will be particularly significant to those best acquainted with gelatin and its properties. The gelatin casting composition will, within a comparatively short time, attain a very tough consistency, and is very difficult to remove from equipment. It is sufficiently resilient so that it is not possible to conveniently scrape it off and it dissolves slowly in warm water. Boiling water will remove the gelatin, but this is expensive and results in the loss of the gelatin.

With conventional types of mixers where it is necessary to clean the mixer, more time and effort may be spent in keeping the mixer clean than in its use. We find that by re-using the mixer in accordance with this invention, much time and effort is saved. If the mixer has comparatively low heat capacity, the water and glycerin used for the preparation will cool off the mixer. Otherwise, a cooling liquid should be passed through the jacket so as to cool it sufficiently that hydration does not occur before the operator is ready.

The re-using of the mixer without cleaning, and the remarkable speed that comes from mixing and melting in a single receptacle at a single time permits a short time cycle so that several batches may be prepared within a normal working day. With production size mixers in use, it is frequently possible to complete a cycle within one hour, so that the mixer is ready to be reloaded. This speed is of particular value in starting up the machines initially, because the first capsules can be coming off the end of the capsule forming machine within one hour of the time of starting the gelatin mixing operations. When this is contrasted with the three days normally used in the industry, to melt up the gelatin, temper it, and prepare it for use, the efficacy of our invention will be obvious.

The flexibility of operating in accordance with our invention is very advantageous. The gelatin in the holding tank can be kept from 2 to 4 days at 56° C. without the gelatin becoming so degraded so as to be unsatisfactory. This temperature is comparatively critical, because at a temperature of 60° C. the material is unsatisfactory after two days. At 62° C. the material is so degraded as to lose its resilience within 12 hours. At temperatures as cold as 46° C., the material is so viscous that it is difficult to handle.

Our method permits the use of a less expensive gelatin. In the past, bone gelatin has been used for capsules. We can use the cheaper pork skin gelatin.

The incorporation of all of the liquids into the mixer before admixture of the solids permits the incorporation of other liquids with the water and gelatin.

Preservatives such as the methyl and propyl esters of para-hydroxybenzoic acid, and dyestuffs, as well as flavors and odors, may be added to the water before the addition of the gelatin. For convenience in dispersion, these materials may be dissolved in a small amount of alcohol, which is mixed in with the water and the glycerin. If solid materials, such as pigments, are to be incorporated in the final film, they may be mixed with the dry gelatin to form a homogeneous blend of the solids.

In the drawings is shown a diagrammatic flowsheet in Figure 1 of the mixing step, and, in Figure 2, of the transfer step of our procedures. The equipment is standard chemical engineering apparatus, and the details are conventional. Whereas the individual items of equipment are well known, their combination into the particular order as shown is part of our invention.

In Figure 1 there is diagrammatically shown a heat-jacketed mixer. A double Sigma or Ribbon mixer which is sturdily built and heat jacketed gives excellent results. Hollow heated blades which almost scrape the walls of the mixer permit faster heating. An electric heater may be used, but the greater flexibility permitted by the use of the fluid jacketed mixer in which hot water, steam, or cold water may be used for temperature control, is advantageous. The mixer is provided with a vacuum tight cover. The addition of liquids and solids is shown. Reusable web or scrap stock may be added to the warmed mix and remelted and reused in the process. A complete run of just reworkable stock can be used, with a small amount of water being added to make up losses.

Figure 2 shows the transfer step in which, after agitation and mixing and heating, the castable mixture is transferred by high pressure air through a heat-jacketed transfer line to a jacketed storage tank, from which the material is transferred by low pressure air through a heat-jacketed line to the casting machine. An electrically heated jacket may be used for the transfer lines, or they may be provided with a double wall and a heat fluid, such as water, at 56° C. circulated therethrough.

By way of illustration, but not limitation, certain examples of operations with particular materials are given:

*Example 1*

A 15 gallon double arm Sigma mixer, air-tight, and provided with a heating jacket, was used, the particular machine being a "Reedco" mixer. 7.5 kilos of distilled water and 7.5 kilos of glycerin U. S. P. were put into the mixer, the mixer being clean, and the mixer stirred a few minutes until mixed. From a holding container through a chute, there was dropped into the mixer as rapidly as the chute would transfer it, 10 kilos of 200 Bloom strength pork skin gelatin, and the cover placed on the machine, the agitators being run meanwhile. The cover was closed and the agitation continued while a vacuum was applied to the machine with a steam jet. The jacket temperature, which was room temperature of approximately 25° C., was then raised to 100° C. by steam and the mixing continued for approximately 30 minutes, during which time the mixture was raised to about 45° C. and a smooth homogeneous mass obtained. At the end of 40 minutes, the temperature had reached to 56° C. and the mixing at this temperature was continued for approximately 5 minutes to insure that all portions of the mixture were uniform, homogeneous and at the same temperature. Agitation was discontinued. A discharge line from the bottom of the mixer was opened, and 15 pounds air pressure introduced into the mixer which transferred its contents through the discharge line into a jacketed storage tank, which was under 10 pounds air pressure and also at a temperature of 56° C. The mixture transferred smoothly and uniformly into the storage tank. The tank was already partly filled and was being used for the operation of a casting machine. The new gelatin mixture flowed smoothly and uniformly into the tank without affecting the casting operation.

*Example 2*

115.2 kilos of 200 Bloom strength pork skin gelatin was barrel-rolled with 1.2 kilos of crimson red pigment for approximately ½ hour. 252 grams of beta-naphthol, 192 grams of methyl para-hydroxybenzoic acid and 48 grams of propyl para-hydroxybenzoic acid, 288 grams of the flavoring extract sold as "Ethavan" and 72 grams of coumarin were mixed with 2,880 grams of ethyl alcohol and the mixture stirred until dissolved. 83.76 kilos of distilled water were placed in a clean ribbon mixer and the ribbon agitators started. 480 grams of red dye, F. D. & C. No. 4, 420 grams of red dye, F. D. & C. No. 2, were added to the distilled water and dissolved therein. To this aqueous solution was then added 43.2 kilos of glycerin and agitation continued. To this mixture was then added the alcoholic solution of flavors and stabilizer, and agitation continued for a few minutes. The mixture appeared homogeneous and thereto was added the gelatin containing the pigment. The galatin was added rapidly from a chute, agitation being continued during the addition. The cover was immediately placed on the mixer and vacuum applied from a steam jet to withdraw substantially all of the air from the mixer. Agitation was continued and steam supplied to the jacket, to warm up the mixture while agitation was continued. It required approximately 45 minutes for the mixture to become heated to a temperature of 56° C., the addition of steam being reduced during the last twenty minutes and discontinued entirely for the last few minutes, during which the material was agitated to insure that it was all at the proper temperature. Mixing was continued for an additional five minutes without any additional heat being supplied. Agitation was discontinued and 20 pounds of air pressure introduced into the mixer. A discharge line at the bottom was opened and the contents were blown into a low pressure jacketed storage tank, where the composition was held at 56° C. as it was being used in the casting machine for the manufacture of capsules.

*Example 3*

111.8 kilos of 200 Bloom strength pork skin gelatin and 1.2 kilos of lampblack were barrel-rolled for one hour to insure thorough mixing. 120 grams of F. D. & C. Red No. 2, 72 grams of F. D. & C. Yellow Dye No. 5 and 240 grams of F. D. & C. Blue Dye No. 1 were dissolved in 78 kilos of distilled water. 252 grams of beta-naphthol, 102 grams of methyl para-hydroxybenzoic acid and 48 grams of propyl para-hydroxybenzoic acid, 288 grams of "Ethavan" and 72 grams of coumarin were dissolved in 3.6 kilos of re-distilled ethyl alcohol. 70.2 kilos of glycerin U. S. P. were poured in a double arm Sigma mixer, provided with a heating jacket and a vacuum-tight cover, together with a port for the introduction of liquids and a port for the introduction of solids. The mixer was stainless steel lined and was provided with a blade type discharge valve so that when the valve was closed, no solids were trapped in the discharge line. The mixer was in the as-used condition from a preceding similar batch and had not been in any way cleaned; merely the contents had been discharged insofar as they would flow from the discharge line. The alcohol containing the naphthol, the esters and the flavors was added, the mixture being agitated at a high speed so as to thoroughly mix the materials and thereto was added the distilled water containing the dyes. Agitation was continued as cold water was introduced into the jacket so that the mixer contents were at the temperature of approximately 16° C. and were homogeneous. To this mixture with continuous agitation, was added the mixture of gelatin and lampblack. A vacuum was drawn in the mixer. As mixing continued, steam was introduced into the jacket and the temperature of the water jacket allowed to rise to approximately 100° C. The rate of introduction of steam to the water jacket was reduced as the contents reached about 45° C. and discontinued shortly before the contents reached 54° C., so that the entire machine came to temperature equilibrium at a temperature of 54° C. After mixing at the temperature of 54° C. for approximately 5 minutes, the mixing was discontinued, 20 pounds of air pressure was introduced into the mixer and the discharge line opened. The contents were transferred by the air pressure to a 54° C. jacketed holding tank which was under 10 pounds air pressure and, at the time, being used for the production of soft gelatin capsules. The additional contents were added to the tank without disturbing the flow from it into the capsuling machine.

As will be obvious to those skilled in the art, the exact compositions may be varied over a wide range. The choice of preservatives, flavors, odors and colors, both dyes and pigments, are clearly within the range of operating expedience. Those given in the examples in no way limit the variety which may be used. The preservatives, colors, odors, and dyes are a matter of choice, depending upon the color, the flavor and the preservative desired in the finished product. Capsules may be produced without the incorporation of such materials in the films.

Other modifications will be apparent to those skilled in the art of gelatin capsule manufacture.

Having thus described certain examples thereof, as our invention we claim:

1. The method of preparing a castable gelatin formulation which comprises intermixing gelatin, glycerin and water with agitation, and with substantially constant mixing supplying heat, maintaining a vacuum sufficient to remove air but not an appreciable part of the water during the application of the heat, maintaining substantially the same temperature through the entire mix until the entire mix is at a temperature of not less than about 46° C. and not more than about 60° C., and transferring the thus prepared formulation to a casting means.

2. The method of preparing a castable gelatin formulation which comprises mixing glycerin and water together with a selection of flavors, odors and water-dispersible dyes, and adding thereto gelatin with continuous agitation, evacuating the mixer, and adding heat with substantially constant mixing until the mixture is at a temperature of approximately 46° to 60° C.

3. The method of preparing a castable gelatin formulation which comprises mixing glycerin and water together with water-dispersible blending components including at least one member from the group consisting of flavors, odors, water-dispersible dyes and preservatives, and adding thereto dry gelatin mixed with at least one pigment, evacuating the mixer sufficiently to remove air but not an appreciable part of the water and adding heat with substantially constant mixing until the mixture is at a temperature of approximately 46° C. to 60° C.

4. The method of preparing a castable gelatin formulation which comprises mixing glycerin and water, adding dry gelatin, and with substantially constant agitation, heating under such a reduced pressure as to remove substantially all of the air but not an appreciable part of the water until the mixture is at a temperature of approximately 46° C. to 60° C., and is substantially homogeneous, and transferring to a gelatin casting machine.

5. The method of claim 4 in which the gelatin mix is transferred while hot to a heated holding tank and then transferred from the holding tank as required to a casting machine.

6. The method of claim 4 in which the transfer to the casting machine is accomplished by gaseous pressure.

7. A method of continuously preparing batches of castable gelatin formulations in a mixing cycle which comprises mixing glycerin and water, adding dry gelatin, and with substantially constant heat and agitation heating the mixture under reduced pressure until said mixture is at a temperature of approximately 46° to 60° C. and is substantially homogeneous, and transferring the mixture to a holding tank, and repeating the above recited mixing cycle in the same mixer, said mixer then containing a residual portion of the mixture from the previous cycle.

8. The method of claim 2 in which a pigment is intermixed with the gelatin before the addition of the gelatin to the mixer.

9. In an apparatus for preparing a castable gelatin formulation; a vacuum tight mixer, a heating jacket for said mixer, means for adding liquids to said mixer, means for adding powdered solids to said mixer, means for agitating the contents of said mixer, a vacuum source, a source of gaseous pressure, means for connecting said source of gaseous pressure and said vacuum source to said mixer, a discharge line connected to the bottom of said mixer, heating means for said discharge line, a storage tank, a heating jacket for said storage tank, a second gaseous pressure source connected to said storage tank, said second source being at a lower pressure than the first recited source of gaseous pressure, a transfer line to a casting machine, and a heating jacket for said transfer line, whereby the storage tank may have its contents replenished during continuous operation without interrupting the continuous pressure feed from said storage tank to the casting machine.

References Cited in the file of this patent

UNITED STATES PATENTS

| | | |
|---|---|---|
| 2,124,767 | Dawn | July 26, 1938 |
| 2,273,188 | Graves | Feb. 17, 1942 |
| 2,515,250 | McIntire | July 18, 1950 |
| 2,542,386 | Beattie | Feb. 20, 1951 |
| 2,558,065 | Tice | June 26, 1951 |